July 10, 1934.  C. E. BANNISTER  1,965,564
FLUID MOTOR
Filed May 4, 1931   5 Sheets-Sheet 2
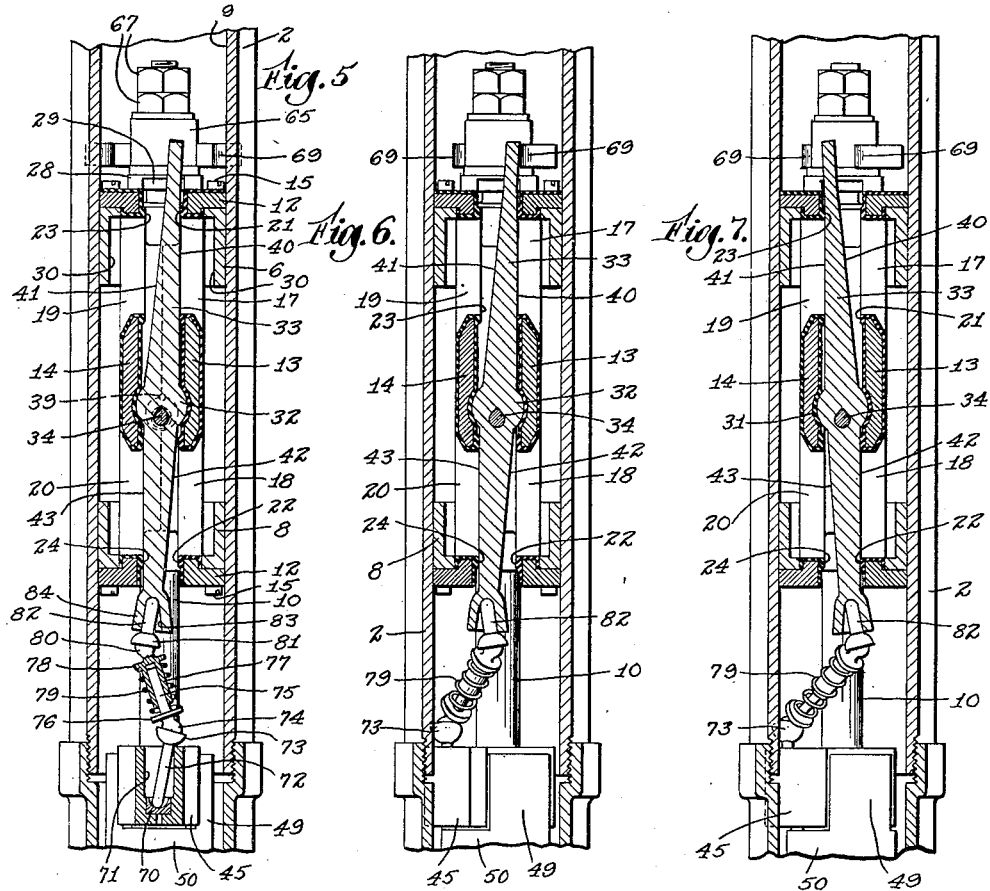
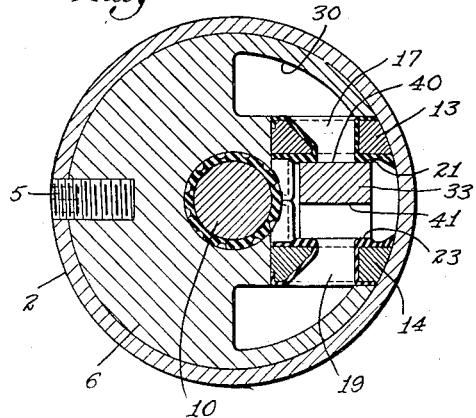
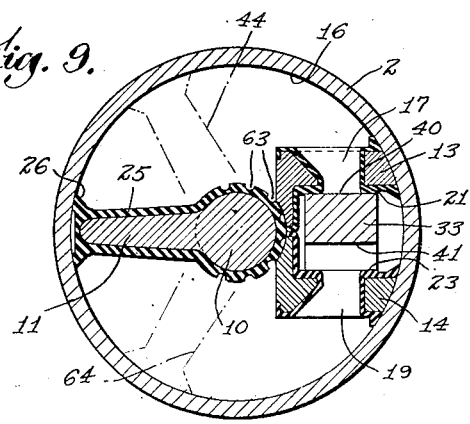
Inventor
Clyde E. Bannister
by James R. Hodder
Attorney July 10, 1934.  C. E. BANNISTER  1,965,564
FLUID MOTOR
Filed May 4, 1931  5 Sheets-Sheet 3
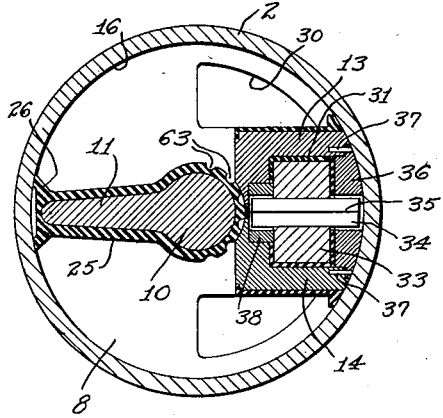
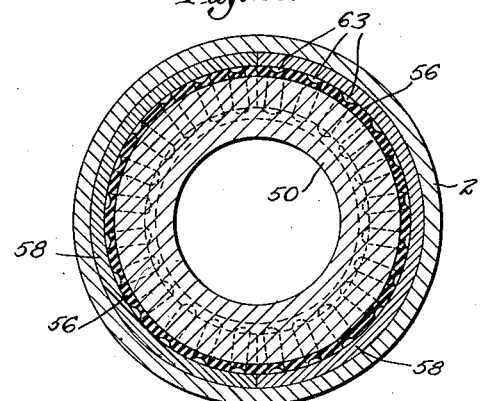
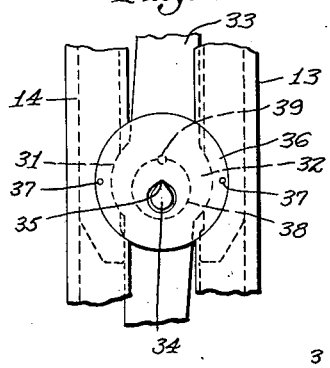
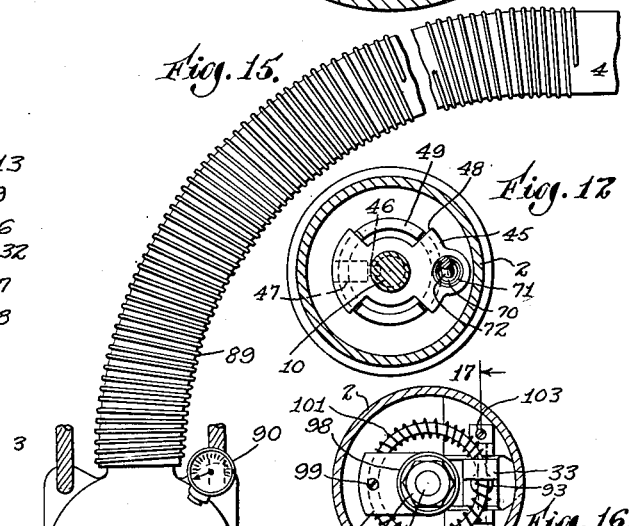

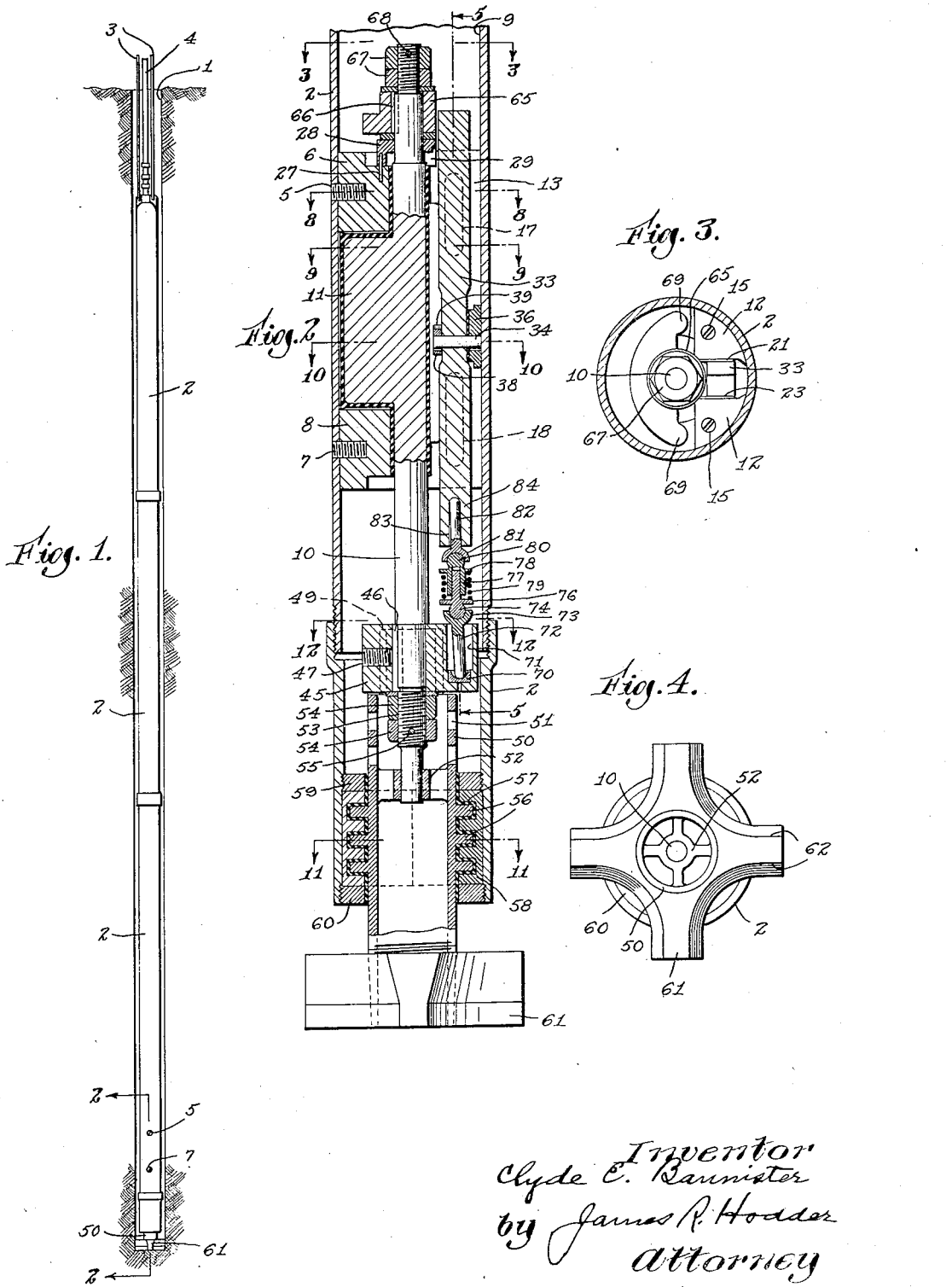

July 10, 1934.                C. E. BANNISTER                1,965,564
                                FLUID MOTOR
                            Filed May 4, 1931            5 Sheets-Sheet 4
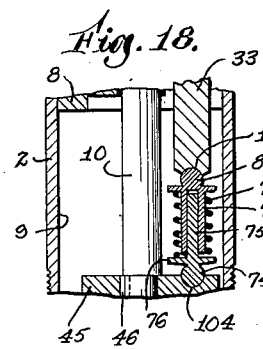
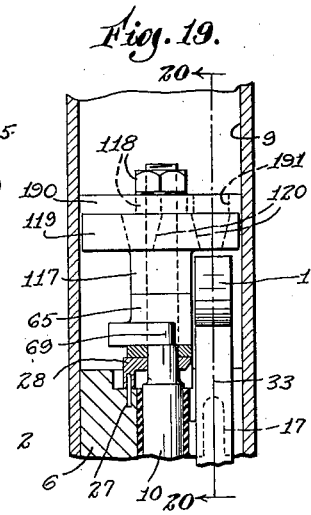
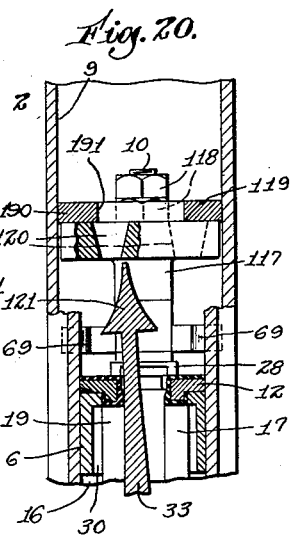
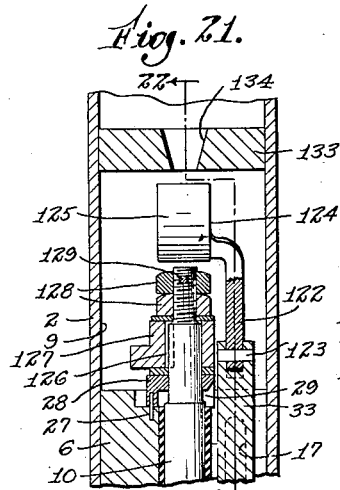
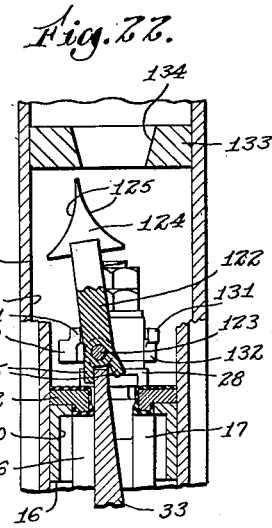
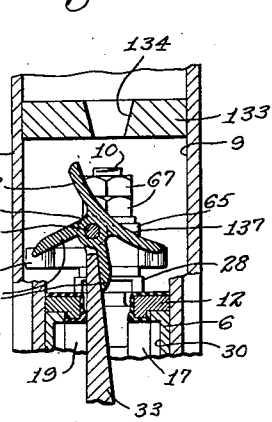
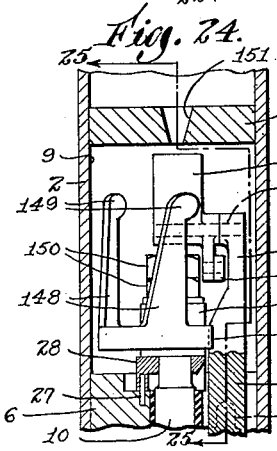
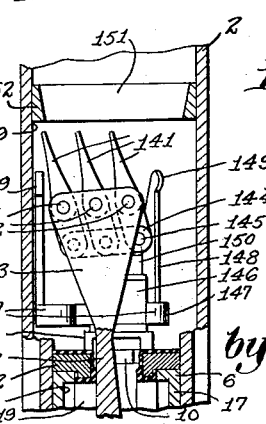
Inventor
Clyde E. Bannister
by James R. Hodder
Attorney July 10, 1934.  C. E. BANNISTER  1,965,564
FLUID MOTOR
Filed May 4, 1931   5 Sheets-Sheet 5
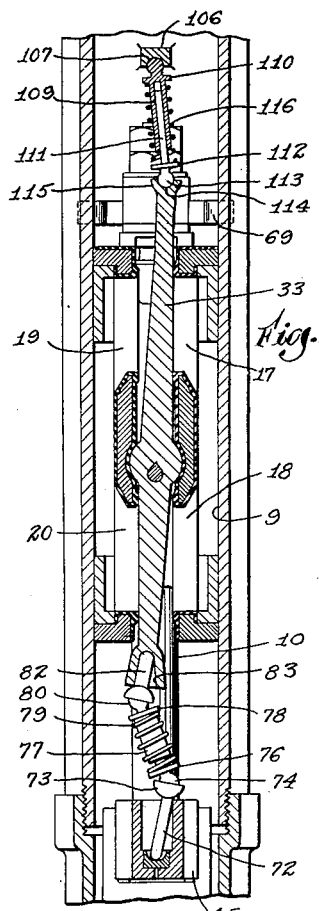
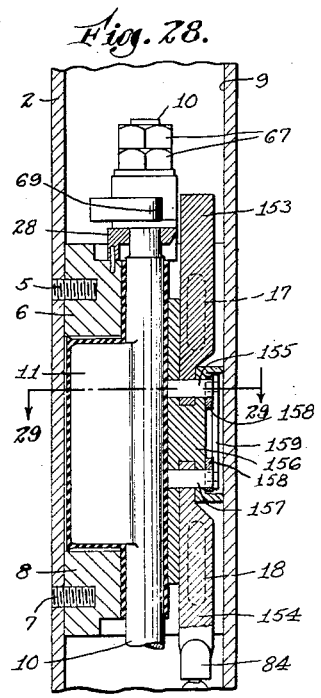
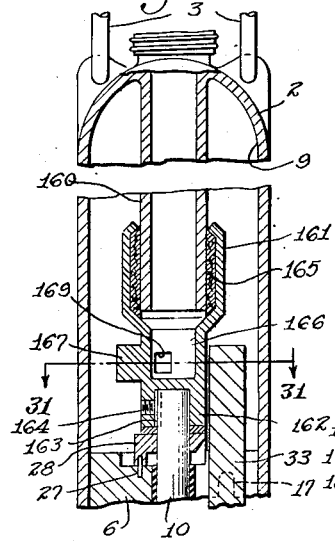
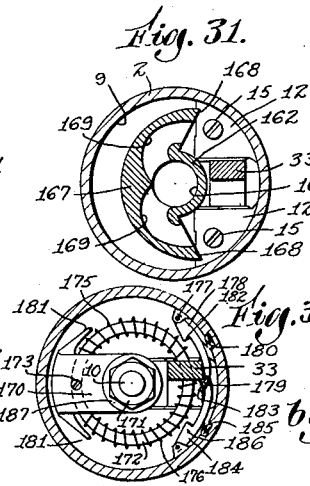
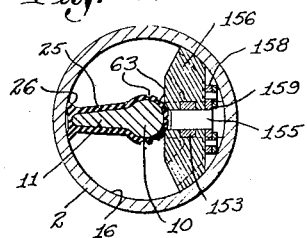
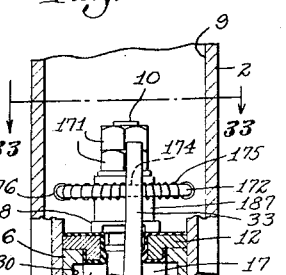
Inventor
Clyde E. Bannister
by James R. Hodder
Attorney Patented July 10, 1934

1,965,564

UNITED STATES PATENT OFFICE 1,965,564

FLUID MOTOR

Clyde E. Bannister, Houston, Tex.

Application May 4, 1931, Serial No. 534,832

14 Claims. (Cl. 255—4)

My present invention relates to fluid motors, and more particularly to a novel fluid motor particularly adapted for use in the drilling of deep wells or bores, such as oil wells, for example.

An important object of the present invention is the provision of well drilling apparatus wherein the cutting bit or tool is operated with an oscillating motion while the apparatus is freely suspended in the bore being formed, whereby the drilling of the well is a continuous operation.

Another object of the invention resides in the provision of a well boring machine wherein the shaft which carries the cutting bit or tool is operated by the direct action of the fluid utilized, without the use of any intermediate or interposed conversion mechanism.

In my present apparatus, the motor which operates the cutting bit is controlled and operated by the same fluid that is utilized to flush the cuttings from the bottom of the bore, away from the cutting bit, and out of the bore.

Another object of the invention resides in the provision of a well drilling apparatus including my novel motor, wherein the working barrel carrying the motor and cutter is restrained from movement solely by its own inertia, and without the use of anchoring or locking means such as have heretofore been required when utilizing well drilling apparatus wherein the cutting bit continuously rotated in one direction.

The drilling of a well utilizing my novel apparatus will obviate the tedious making up and breaking down operations which have been heretofore requisite in well drilling apparatus utilizing rigid threaded drill stems. The delays at present encountered in changing drilling tools, taking cores, and other operations required by present processes will also be eliminated.

Another object of the present invention resides in the provision of a motor having a minimum number of moving parts, whereby the construction and operation of said motor is greatly simplified, and such motor is also inexpensive to construct.

A still further object of the present invention resides in the provision of a fluid motor wherein all working parts are lubricated by the fluid operating the motor, thus dispensing with separate lubricating means which of necessity present great difficulties when working at considerable depths.

My novel motor is not only simple and inexpensive to construct, but is possessed of the further advantage that the replacement of working parts is simplified to the highest degree.

In my novel motor the torque may be increased within wide ranges, even in small diameters of bores, whereas in prior fluid motors utilizing a piston, the torque is limited by the size of the piston, which in turn is limited by the diameter of the cylinder within which said pistons work.

Basically considered, my novel motor comprises a shaft associated with one end of which is the cutting bit, said shaft having an impeller or vane integral therewith. This vane or impeller is located within a chamber, said chamber being provided with a plurality of inlet and exhaust ports, said inlet ports being directly in line with the course of the fluid utilized to operate the device.

Another and important object of the present invention resides in the provision of a novel valve, so constructed and arranged relative to the inlet and exhaust ports that, when the inlet port leading to said chamber at one side of said impeller is open, the exhaust port communicating with said chamber on the same side of said impeller is closed, and at the same time the inlet port leading to said chamber at the other side of said impeller is closed, and the corresponding exhaust port is open.

Another object of the invention resides in the provision of means to unseat said valve from the closed inlet and exhaust ports and means to positively reverse the position of said valve to close the opposite inlet and exhaust ports.

In the drawings of the present application I have illustrated several means to effect this last named operation, but all of said means are within the range of the present invention, as will be instantly understood by those skilled in this art.

A still further object of the present invention resides in the provision of means to effect the reversal of said valve by a "load and fire" mechanism, which will be operated at a predetermined instant to shift said valve from one position to another, several modifications or variations of this "load and fire" mechanism being also illustrated and described herein.

Other features and objects of the invention reside in the particular construction and arrangement of parts of my novel mechanism, and all of the above, together with other objects and features, combinations of parts, details of conctruction and advantages, will be hereinafter more fully pointed out, described and claimed.

Referring to the drawings, illustrating preferred embodiments of the present invention, Fig. 1 is a diagrammatic view illustrating a working barrel positioned in a well under process of being bored, in which my novel motor is utilized;

Fig. 2 is a vertical sectional view on the line 2—2 of Fig. 1;

Fig. 3 is a cross sectional view on the line 3—3 of Fig. 2;

Fig. 4 is a bottom plan view;

Fig. 5 is a vertical sectional view on the line 5—5 of Fig. 2;

Figs. 6 and 7 are vertical sectional views corresponding to Fig. 5, illustrating the operation of my novel valve;

Fig. 8 is a cross sectional view on the line 8—8 of Fig. 2;

Fig. 9 is a cross sectional view on the line 9—9 of Fig. 2;

Fig. 10 is a cross sectional view on the line 10—10 of Fig. 2;

Fig. 11 is a cross sectional view on the line 11—11 of Fig. 2; Figs. 8, 9, 10 and 11 being on an enlarged scale;

Fig. 12 is a cross sectional view on the line 12—12 of Fig. 2;

Fig. 13 is a fragmentary side elevation, on an enlarged scale, of the valve pivot;

Fig. 14 is a fragmentary vertical sectional view illustrating the use of a jet alone to unseat and reseat the valve;

Fig. 15 is a fragmentary side elevation, on an enlarged scale, illustrating the use of a pop-off valve to relieve excessive pressure, and also illustrating the use of a coiled spring wound around the fluid conducting hose adjacent to the working barrel to prevent kinking of said hose on withdrawal from the bore;

Fig. 16 is a plan sectional view illustrating one form of "load and fire" mechanism for operating the valve;

Fig. 17 is a vertical sectional view on the line 17—17 of Fig. 16;

Fig. 18 is a vertical sectional view illustrating a slightly modified construction of the lower valve actuating spring arrow;

Fig. 19 is a vertical sectional view illustrating the combination of a jet with the knocker arm to operate the valve;

Fig. 20 is a vertical sectional view on the line 20—20 of Fig. 19;

Fig. 21 is a vertical sectional view illustrating an arrow-head pivoted on the top of the valve and actuated by a jet to assist the knocker arm in operating the valve;

Fig. 22 is a vertical sectional view on the line 22—22 of Fig. 21;

Fig. 23 is a vertical sectional view illustrating a concaved pivoted head to perform the same function as the pivoted arrow in Figs. 21 and 22;

Fig. 24 is a vertical sectional view illustrating a plurality of pivoted arrows on the top of the valve actuated by a jet and cooperating with the knocker arm;

Fig. 25 is a vertical sectional view on the line 25—25 of Fig. 24;

Fig. 26 is a vertical sectional view illustrating a spring arrow located at the top of the valve to assist the lower spring arrow in actuating the valve after being unseated by the knocker arm;

Fig. 27 is a vertical sectional view illustrating a two-part valve;

Fig. 28 is a vertical sectional view on the line 28—28 of Fig. 27;

Fig. 29 is a cross sectional view on the line 29—29 of Fig. 28;

Fig. 30 is a vertical sectional view illustrating the use, in the apparatus of Fig. 1, of a jet combined with the knocker arm to unseat and shift the valve;

Fig. 31 is a cross sectional view on the line 31—31 of Fig. 30;

Fig. 32 is a vertical sectional view illustrating a modified form of "load and fire" mechanism utilizing pawls to hold the valve in closed position until a predetermined moment; and Fig. 33 is a cross sectional view on the line 33—33 of Fig. 32.

Referring now to the drawings, for a particular description of the invention, its construction, assembly and operation, 1 designates a well or bore being drilled, in which is suspended a working barrel 2 composed of any desired number of sections united in any suitable manner. Cables 3 support the working barrel 2 and extend upwardly to any suitable hoisting or control mechanism, and a flexible hose 4 is connected to the top of the working barrel, this hose being adapted to convey fluid under pressure from any suitable source to the interior 9 of the working barrel 2. Fixed in the working barrel 2 by a screw 5 is a plug 6, and also fixed to the barrel 2 by a screw 7 is a plug 8 spaced a predetermined distance below the plug 6.

A shaft 10 is rotatably mounted in the plugs or blocks 6 and 8, and has associated therewith an impeller or vane 11, this impeller being preferably formed integral with the shaft 10. The plugs 6 and 8 are cut away, on their top and bottom faces respectively, and seated in said cut away portions are the flanges 12 of members 13 and 14, screws 15 securing said flanges 12 to the plugs 6 and 8, respectively. The plugs 6 and 8, barrel 2, and the members 13 and 14 define a chamber 16 within which the impeller 11 may oscillate.

The member 13 is provided with an inlet port 17 and with an exhaust port 18 communicating with the chamber 16, and the member 14 is provided with an inlet port 19 and an exhaust port 20 likewise communicating with the chamber 16. The members 13 and 14 are covered, throughout the major portion of their exposed surfaces, with rubber coatings secured thereto, and these rubber coatings form seats 21 on the inlet port 17, 22 on the outlet port 18, 23 on the inlet port 19 and 24 on the outlet port 20. It will be noted that the pair of seats 21 and 22 and the pair of seats 23 and 24 are on parallel planes.

The shaft 10 and impeller 11 are also coated with rubber, as clearly indicated at 25 in Fig. 9, lips 26 being formed in the rubber coating on the impeller and bearing against the wall of the chamber 16 to effect a tight joint.

Fixed to the plug 6 by a pin 27 is a collar 28, said collar surrounding the shaft 10 and being provided with a recess or cut away portion 29 to permit the fluid conducted through the interior 9 of the working barrel 2 to flow around the upper end of the shaft 10 and down around said shaft to constitute a lubricant.

Each of the plugs 6 and 8 is cut away as indicated at 30 to permit uninterrupted passage of the fluid through all of the ports 17, 18, 19 and 20.

Each of the members 13 and 14 is provided with a recess 31, and in these recesses is seated the hub 32 of a double-wing valve 33, this valve having a pivot pin 34 therethrough adjacent to the lower part of the hub 32. The pivot 34 is provided with a knife edge 35 on its upper surface, said knife edge being engaged by a bushing 36 which is held to the members 13 and 14 by pins 37, and in a bushing 38 which is likewise held against rotation in the members 13 and 14 by a pin 39.

The wings of the valve 33 extend above and below the pivot 34, and are provided with a face 40 adapted to seat against the port seat 21, a face 41 adapted to seat against the port seat 23, a face 42 adapted to seat against the port seat 22, and with a face 43 adapted to seat against the port seat 24. The valve 33 is so constructed and arranged as to close an alternate inlet and exhaust port simultaneously, as for example, the inlet port 17 and outlet port 20, with the valve in the position illustrated in Fig. 5.

Assuming that the valve 33 is in the position illustrated in Fig. 5, it will be apparent that fluid being forced through the interior 9 of the working barrel 2 will pass through the inlet port 19 into the chamber 16, bearing against and forcing the impeller 11 in a clockwise direction, toward the position illustrated in dotted lines at 44 in Fig. 9. This will effect an exhaust or discharge of the fluid on the opposite side of the impeller 11 out through the exhaust port 18, whence it will continue downwardly through the working barrel and to the bit, as will be more fully described hereafter.

This movement of the impeller 11 will effect a rotative movement of the shaft 10, and of the clutch block 45 which is keyed thereto by a key 46, a set screw 47 being utilized as an additional securing element. The block 45 is recessed on each side, as illustrated at 48 in Fig. 12, and projecting upwardly into the recesses 48 are reduced extensions 49 of a sleeve 50, said sleeve 50 being provided with apertures 51 to permit the passage of fluid to the interior of said sleeve, said sleeve also being provided with a spider 52 in which is seated the lower reduced end of the shaft 10, the shaft 10 being threaded at 53 and lock nuts 54 preventing longitudinal displacement of the block 45, the lower nut 54 being pinned at 55.

The sleeve 50 is also provided with a plurality of radially projecting flanges 56, said flanges interengaging recesses 57 in a split bushing 58, the sleeve and its flanges being provided with a rubber coating as clearly illustrated. The split bushing 58 is confined between two threaded plugs 59 and 60 threaded into the lower end of the bottom section 2 of the working barrel. Threaded to the bottom of the sleeve 50 is a bit or cutting tool 61, which may be of any desired size or shape, so long as it is provided with cutting edges 62 adapted to cut with equal efficiency in either direction of oscillation of the bit 61.

All of the rubber surfaces herein described, on rotating or oscillating parts, are provided with grooves 63 to permit the passage of fluid therearound, for lubricating purposes.

It is necessary to provide means automatically operable to unseat the valve 33 from the ports 17 and 20, and move said valve to cover the ports 18 and 19, in order that fluid may then enter the chamber 16 by means of the port 17 and move the impeller 11 in a counter-clockwise direction, as for example to the position illustrated at 64 in dotted lines in Fig. 9, forcing the fluid which entered the chamber 16 through the port 19 outwardly through the port 20.

As the preferred form for accomplishing the unseating of the valve 33, for example, from the ports 17 and 20, or in the position as illustrated in Fig. 5, I secure to the upper end of the shaft 10 a collar 65, this collar being keyed to the shaft 10 by a key 66 and held against longitudinal displacement by lock nuts 67, the upper lock nut being pinned to the shaft 10 as at 68. The collar 65 is provided with a pair of radially projecting knocker arms 69. It will thus be appreciated that the knocker arms 69 will be moved in unison with the shaft 10 and impeller 11.

Therefore, as the impeller 11 moves toward the position 44, one of the knocker arms 69 will also be moved toward engagement with the upper end of the valve 33, as clearly illustrated in Fig. 6. Continued movement of the knocker arm 69 will result in the pivoting of the valve 33 on its pivot 34, and an unseating of the valve 33 from the cooperating seats on the ports 17 and 20. The impact and continued movement of the knocker arm 69 to the position illustrated in Fig. 7, or beyond, would probably be sufficient to swing the valve 33 to the position illustrated in Fig. 7, that is, with the face 41 engaging the seat 23 and with the face 42 engaging the seat 22, thus closing the ports 19 and 18, and permitting the fluid to enter the chamber 16 by means of the port 17 and to be discharged therefrom, by the movement of the impeller 11, through the port 20. As the impeller is moving in the reverse direction, the knocker arms 69 will likewise be moved in reverse direction, until the second knocker arm engages the upper end of the valve 33 and repeats the operation above described, but in a reverse direction, and this movement will continue, opening and closing alternate inlet and exhaust ports, as long as fluid under pressure is introduced into the working barrel.

In order to insure shifting of the valve 33 from one set of inlet and exhaust ports to the opposite set of inlet and exhaust ports, and to prevent any stoppage of the valve 33 on dead center, I provide means to cooperate with and assist the knocker arms 69. This mechanism comprises a socket member 70 located in the bottom of a recess 71 in the clutch block 45, and seated in said socket member is the lower end of a post 72, the upper end of said post being formed with a socket member 73 in which seats the ball end 74 of a pin 75, this pin 75 having a shoulder or collar 76 formed thereon.

Slidable over the pin 75 is a sleeved member 77 which I will hereinafter refer to as a spring arrow. The arrow 77 has a shoulder or collar 78 formed thereon, the collars 76 and 78 forming abutments for a coiled spring 79. A ball end 80 is formed on the upper end of the arrow 77 and seats in a socket member 81 carried by the post 82 which is rockable in a recess 83 formed in the flared end 84 of the valve 33. The block 45 constitutes restraining means for the spring 79 and is compelled to move as an incident of the movement of the vane or piston 11 and thus to shift the position of the spring's lower abutment on the collar 76 for timing the over-center action of the spring.

Assuming that the motor is in the position illustrated in Fig. 5, with the valve 33 closing the ports 17 and 20. The fluid under pressure as it passes through the interior 9 of the working barrel 2 will therefore enter the chamber 16 through the port 19, and will force the impeller 11 in a clockwise direction, exhausting the fluid in the chamber 16 through the outlet port 18. This movement of the impeller will likewise effect a rotation of the shaft 10 and knocker arms 69. The clutch block 45 will also be rotated with the shaft 10, carrying the socket member in a clockwise direction or to the left, as illustrated in Figs. 5, 6 and 7, carrying the post 72 therewith. As the rotative movement of the clutch block 45 is continued, the elements 82, 77, 75 and 72 will become straightened, as a toggle, compressing the spring 79 between the collars 76 and 78. After the aforementioned members have passed their vertical position, the spring 79 will expand, but still be held in compression. As the recess 71 reaches the extent of its stroke to the left, one knocker arm 69 is in engagement with the upper end of the valve 33. Meanwhile the spring 79 through the medium of the arrow 77 and post 82 is exerting a pressure on the lower end of the valve 33, tending to unseat said valve. However, the pressure of the spring 79 is insufficient in itself to accomplish this unseating of the valve 33.

As the knocker arm 69 continues to the left, Fig. 6, it will strike the upper end of the valve 33 and unseat the same. The fluid pressure on the opposite sides of the valve being now equalized, the spring arrow 77 will shoot away from the member 75, instantly pivoting the valve 33 on its pivot 34 and seating the same against the seats of the ports 19 and 18, and directing the fluid through the inlet port 17. Thereupon the fluid will enter the chamber 16 and effect a reverse movement of the impeller 11, and this action will be repeated as long as fluid under pressure is introduced through the working barrel 2.

It will be understood and appreciated that as the impeller 11 is oscillating within its chamber 16, the shaft 10 and clutch block 45 are likewise oscillating, in turn transmitting this oscillation to the sleeve 50 and bit 61 carried thereby. The degree of oscillation of the impeller 11 is dependent on the angle through which the valve 33 moves.

The torque developed by this motor is directly proportional to the exposed area of the impeller 11, and this torque may be varied by varying the length of the impeller, as well, of course, as by varying the diameter of the chamber 16.

It will be apparent, from a glance at Figs. 5, 6 and 7, that the inlet ports 17 and 19 are located a greater distance from the pivot 34 than the exhaust ports 18 and 20. This provides an increased leverage on the surfaces of the valve 33 which cooperate with the ports 18 and 20, and overcomes any tendency of fluid introduced into one side of the chamber 16 to unseat the valve from the exhaust port on the same side of said chamber.

I believe that the fluid motor herein illustrated and above briefly described is novel, and have therefore claimed the same broadly herein.

I also believe that the valve mechanism herein illustrated and described is novel, and have therefore claimed said valve mechanism broadly in this application.

Referring now to Fig. 14, I have illustrated, in place of the knocker arms 69, a sleeve 84 provided with a collar 85 projecting laterally from the upper end of said sleeve, said sleeve being held on the threaded upper end of the shaft 10 by nuts 86. Formed in the collar 85 is a flared port 87, this port being adapted to index at predetermined intervals, with the upper end of the valve 33, the upper end of said valve being provided with an arrow head 88, the sides of said head 88 being concaved. As the shaft 10 is rotated by the impeller 11, the sleeve 84 and collar 85 will be likewise rotated, and the port 87 be brought into alternate index with opposite sides of the arrow head 88. Fluid under pressure being forced through the interior 9 of the valve 2 will also be forced through the port 87 and alternately impinged as a jet against the opposite sides of the arrow head 88, the force of this jet being sufficient to unseat the valve 33 and shoot same across to position to close the opposite inlet and exhaust ports.

This is a very simple means to effect the unseating and shifting of the valve 33, as will be readily apparent by those skilled in this art.

In Fig. 15 I have illustrated the hose 4 as surrounded by a coiled spring 89 extending over any desired length of said hose 3 from closely adjacent to the working barrel 2. The purpose of this spring 89 is to prevent kinking of the hose 4 at this vital point during withdrawal of the working barrel from its bore and lowering of said barrel into the bore.

In Fig. 15 I also have illustrated a pop-off valve 90, which may be set at any predetermined pressure, and after said pressure has been reached, as by reason of jamming of the bit, said pop-off valve will operate and permit a release of the pressure within the working barrel 2.

In Figs. 16 and 17 I have illustrated a form of "load and fire" mechanism to unseat the valve 33 and shift the same, repeatedly, to its opposite position. In this form of the invention I affix, to the flanges 12 a pair of posts 91, these posts carrying a shaft 92 to which is rigidly fixed a resilient spherical member 93, this spherical member or ball 93 being in registry with an aperture 94 in the upper end of the valve 33, the wall of the aperture 94 being convexed, as clearly illustrated.

Through the valve 33, and above the aperture 94 is a second aperture 95, through which slides a ring 96, this ring being held in a flange 97 projecting radially from a sleeve 98, a set screw 99 clamping said ring 96 in said flange. The sleeve 98 is fixed to the upper end of the shaft 10 by means of nuts 100. Interposed between one side of the flange 97 and the corresponding side of the valve 33 is a coiled spring 101, and interposed between the opposite side of the flange 97 and the corresponding side of the valve 33 is a coiled spring 102.

Thus, as the shaft 10 is rotated by the impeller 11, as above described, rotation will also be imparted to the sleeve 98 and flange 97. With the valve 33 in the position illustrated in Figs. 16 and 17, such movement of the flange 97 would be in a clockwise direction, and would result in compressing the spring 101 against the corresponding side of the valve 33 until the compression of the spring 101 becomes sufficient to force the aperture 94 over the resilient ball 93.

As the pressure is built up in the spring 101, when the moment arrives that the valve 33 is passed over the ball 93, the built up pressure of the spring 101 will snap said spring over to close the opposite inlet and exhaust ports. On movement of the impeller 11 in the opposite direction, the spring 102 will be compressed until the result above mentioned is repeated. Movement of the posts 91 is prevented by reason of the screws 103 fixing the bases of said posts to the flanges 12. It will be appreciated that this "load and fire" device will insure that the valve 33 will remain seated until the impeller 11 has completed its desired stroke in one direction, and will also insure the positive snapping or shooting of the valve to opposite port sealing position.

In Fig. 18 I have illustrated a slightly modified arrangement of the lower toggle, wherein the clutch block 45 is provided with a slot or recess 104, and the ball end 74 of the member 75 is seated directly in said recess 104, thus eliminating the post 72, its cooperating socket member 70 and its integral socket member 73, see Fig. 5.

While the form of lower toggle illustrated in Fig. 5 is preferable, as being less likely to permit a stop on dead center, nevertheless the form illustrated in Fig. 18 is also efficient. In addition to eliminating the bottom post 72, the upper post 82 is also eliminated, the ball end 80 of the spring arrow 77 being seated in a concaved recess 105 formed directly in the lower end of the valve 33.

Referring now to Figs. 19 and 20, I have illustrated the use of a pair of movable jets to assist the knocker arms in actuating the valve 33. In this form of my invention, a collar 117 is fixed on the shaft 10 above the collar 65, and held thereon by means of nuts 118. The upper end of the collar 117 is formed as a disc 119, and extending through said disc is a pair of flared ports 120. These ports 120 are so arranged with respect to the knocker arms 69 that, as one of the knocker arms 69 engages the head 121 of the valve 33, to unseat said valve, one of said ports will be in registry with one of the concaved faces of the arrow head 121, and the fluid under pressure passing through the said port 120 will impinge against said concaved face and materially assist the knocker arm 69 in unseating the valve 33, and after said valve is unseated, said jet will shoot said valve across to close the alternate opposite inlet and exhaust ports. In order to assure full force of the fluid under pressure being concentrated through the port 120, which is in operating position, I fix, in the barrel 2, a plug or baffle plate 190 having therethrough a port 191. Thus, as a port 120 is moved into operating position, for example, as illustrated in Fig. 20, the plug 190 will prevent the passage of fluid through the unused port 120, and will concentrate the entire force of the fluid under pressure through the port 120 which is in operating position. The port 191 is of sufficient extent so that there will never be a cessation of the flow of fluid therethrough, as the ports 120, in being moved from inoperative to operative position will always permit a flow of fluid therethrough.

This form of my invention is simple, and when being assembled the ports 120 will be located in such position as to be operated in synchronism with the knocker arms 69. The knocker arms 69 will not engage the wing of the valve 33, but as clearly illustrated in Fig. 20, will engage the sides of the arrow head 121 on said wing.

Referring now to Figs. 21 and 22, I have illustrated a modification of arrow head and jet arrangement to assist the knocker arms in actuating the valve 33 to its alternate positions. In these Figs. 21 and 22 an arrow 122 is pivoted to the top of the valve 33 by means of a pivot pin 123, and this arrow 122 has an offset head 124 with concaved faces as illustrated at 125. Fixed to the upper end of the shaft 10 by a key 126 is a collar 127, nuts 128 preventing longitudinal displacement of said collar, and one of said nuts being pinned to the shaft at 129 as clearly illustrated in Fig. 21.

The collar 127 is provided with a pair of knocker arms 130, each of these knocker arms having a pair of knockers 131 and 132. Fixed in the interior 9 of the barrel 2 is a plug 133 having a flared port 134 therethrough, this port being located approximately centrally of the interior 9 and the offset arrow head 124 being so situated as to pass directly beneath the port 134. Thus, as the shaft 10 is rotated by the impeller 11, the collar 127 will also be rotated, and at a predetermined instant the top knocker 131 will engage the arrow 122 above its pivot 123, and will tip said arrow so that one of the concaved surfaces 125 will be subject to the impinging jet forced through the port 134.

Thereupon the lower knocker 132 will strike the arrow adjacent to its pivot, and unseat the valve 33 from the port 19. Upon unseating of the valve 33, and the release of pressure thereon, the impinging jet projecting through the port 134 will exert sufficient pressure on the arrow 122 to shoot the valve 33 across to its opposite position, sealing the port 17 and its cooperating exhaust port. Depending lugs 135 are formed on the arrow 122 below its pivot, to engage the upper end of the valve 33 and limit the pivotal movement of the arrow 122 on said valve.

In Fig. 23 is illustrated a slightly different type of arrow 136, having a dished or cupped face 137 adapted to be acted upon by the impinging jet of fluid projected through the port 134 in the plug 133. The head 138 of said arrow is offset, in the same manner as the head 124, this arrow being pivoted at 139 to the top of the valve 33. Arms 140 depend from the arrow 136 and engage opposite sides of the valve 33 to limit the rocking movement of said arrow. With this type of arrow the collar 65 and knocker arms 69 are utilized, each knocker arm alternately engaging one of the arms 140 on the arrow 136 to rock the same and present the dished face 137 to the impinging jet at a different angle, so that the force of said jet will shoot the valve 33 to its opposite position after it has been unseated by the knocker arm 69.

In Figs. 24 and 25 I have illustrated a plurality of arrow heads 141, pivoted at 142 to the flared heads 143 of the valve 33, these arrow heads 141 being pivotally united by a link 144 to which the lower ends of the arrow heads 141 are pivotally united by pins 145. Fixed on the shaft 10 is a collar 146 carrying a pair of knocker arms 147, and extending vertically from the knocker arms 147 are a pair of posts 148, each of these posts having a knocker 149 at its upper end. The collar 146 is held to the shaft 10 by means of the nuts 150, and is keyed thereto in the usual manner. Rotation of the shaft 10 by the impeller 11 will also effect rotation of the collar 146, knocker arms 147 and knockers 149. The arrow heads 141 are located under the port 151 in the plug 152. As the knocker arms 147 and knockers 149 rotate, the knockers 149 will alternately engage the outside arrow head 141 above their pivot points 142 and will simultaneously tip all of said arrow heads in a direction whereby the impinging jet through the port 151 will shoot said valve 33 to its opposite position after said valve has been unseated by a knocker arm 147 in its rotation.

In Fig. 26 I have illustrated a toggle spring arrow arrangement at the top of the valve 33 to assist the lower toggle spring arrow in actuating the valve after it has been unseated by the knocker arm, and also to exert pressure against the valve until it has been actually engaged by the knocker arm. Thus, instead of relying simply upon fluid pressure to insure seating of the valve, the upper toggle arrangement of Fig. 26 will insure that the valve will remain seated until the proper and predetermined moment.

In the form of the invention illustrated in Fig. 26 ports for impinging jets may be incorporated in the knocker arm 69, in the manner further illustrated in Fig. 31, as will be readily understood.

Fixed to or formed on the interior 9 of the barrel 2 is a lug or arm 106 provided with a concaved recess 107 within which is seated the ball end 108 of an arrow 109, this arrow being provided with a collar 110. Slidable within the sleeve 109 is a pin 111 having a collar 112 and provided at its lower end with a ball 113 which is seated in the concaved recess 114 in the flared upper end 115 of the valve 33. A spring 116 surrounds the arrow 109 and abuts against the collars 110 and 112. It will be obvious from a glance at Fig. 26 that after the knocker arm 69 has unseated the valve 33, and the top of the valve has passed center, the spring arrow 109 will cooperate with and assist the spring arrow 77 in throwing or shooting the valve to its new position. After the valve 33 has been shifted to its new position, the upper spring arrow 109 will constitute a mechanical means of assisting the fluid pressure in retaining the valve in seated position until again engaged, on its opposite face, by a knocker arm 69.

Referring now to Figs. 27, 28 and 29, I have illustrated, in place of the unitary or one-piece valve 33, a two-part valve comprising a top valve arm 153 and a bottom valve arm 154, the top valve arm 153 being adapted to alternately seal the inlet ports 17 and 19, and the bottom valve arm 154 being adapted to alternately seal the exhaust ports 18 and 20. The upper valve arm 153 is pivotally mounted on a pin 155 which is carried in a block 156, this block 156 taking the place of the two members 13 and 14. The lower valve arm 154 is mounted on a pivot pin 157, also secured in said block 156. Fixed to the outer end of each of the pins 155 and 157 is a plate 158, and connecting the ends of said plates and pivotally attached thereto are links 159. Thus it will be apparent that as a knocker arm 69 strikes the side of the upper end of the valve arm 153, and movement of said valve arm takes place, there will be a simultaneous synchronized movement of the lower valve arm 154, so that in reality the two arms 153 and 154 will operate in the same manner as the unitary valve 33, and will perform all of the functions of said valve.

In Figs. 30 and 31 I have illustrated the use of impinging jets cooperating directly with the knocker arms and bearing against the side of the valve to aid and assist the knocker arm in unseating said valve, and in shooting said valve across to its new position. In this modification of Figs. 30 and 31, I provide a tube 160 depending through the working barrel 2. This tube projects into the sleeve 161 formed on a collar 162, said collar being fixed to the shaft 10 by a key 163, and a set screw 164 holds said key in place. A packing 165 is provided between the sleeve 161 and tube 160 to insure a water-tight joint at this point, and to further insure that the full flow of fluid under pressure through the tube 160 will continue to the interior 166 of the collar 162.

A radial flange 167 is formed on the collar 162 and has knocker arms 168 at its outer ends, channels 169 communicating with the interior 166 and with the faces of the knocker arms 168. Thus, there being a constant flow of fluid under pressure through the tube 160 and outwardly through the channels 169, as the shaft 10 is rotated and a knocker arm 168 comes into contact with the side of the valve 33, there will be an impinging jet of this fluid under pressure bearing against the side of said valve. As soon as said valve has been unseated by the combined action of the knocker arm 168 and said impinging jet, said jet will then shoot said valve across to its opposite port sealing position. This form of my invention is extremely simple and positive, and functions with a high degree of efficiency.

In Figs. 32 and 33 I have illustrated a modification of "load and fire" mechanism wherein pawls are utilized to hold the valve in closed position in place of the ball 93. In this embodiment of my invention a plate or flange 170 is secured to the shaft 10, by means of a collar 187, for rotation therewith, and is held thereon by nuts 171. A ring 172 is fixed in said flange 170 by a set screw 173, said ring being freely slidable through an aperture 174 adjacent to the upper end of the valve 33. Surrounding said ring 172 and located between one face of the flange 170 and the corresponding face of the valve 33 is a coiled spring 175, a coiled spring 176 surrounding the ring and confined between the opposite faces of said flange and valve. Pivotally mounted on the interior of the barrel 2 at 177 is a pawl 178 provided on its outer end with a latch 179. This pawl is normally pressed away from the interior of the barrel 2 by a coiled spring 180, and when the valve 33 is in the position illustrated in Fig. 33, the latch 179 is in engagement with said valve and will hold the same against movement.

Rotative movement being imparted to the shaft 10, the flange 170 will move therewith, and this flange carries a pair of knocker arms 181. From an inspection of Fig. 33 it will be apparent that as the flange 170 is moved in a clockwise direction, the valve 33 will be held against movement by the latch 179, which will result in a compressing of the spring 175 and a building up of pressure therewith. When the predetermined limit of rotative movement of the shaft 10 has been reached, one knocker arm 181 will then engage with the lug 182 on the pawl 178, depressing said pawl against the tension of the spring 180 and releasing the latch 179 from contact with the valve 33. Thereupon the built-up pressure in the spring 175 will shoot the valve 33 to its opposite port-sealing position, and at the instant that said valve has reached its said port-sealing position it will be engaged by the latch 183 on the pawl 184, and said pawl being pressed outwardly by the coiled spring 185, further movement of the valve 33 will be prevented until the flange 170 has moved in a counter-clockwise direction a distance sufficient to enable the other knocker arm 181 to engage the lug 186 on the pawl 184 and to depress said pawl, releasing the latch 183 from its holding position. It will be understood and appreciated that as the valve 33 is being moved from the position illustrated in Fig. 33 to its opposite port-sealing position, it will engage the inclined face of the latch 183 and depress the pawl 184, and that when the valve 33 has passed said latch 183 the spring 185 will force said latch into its holding position.

It will be understood and appreciated that all of the modifications illustrated in this application of means to move or accelerate the movement of the valve from one port-sealing position to another, are within the range and scope of my invention, and said modifications are therefore included broadly in the claims herein.

While I have necessarily described my present invention somewhat in detail, it will be appreciated that I may vary the size, shape, and arrangement of parts within wide limits without departing from the spirit of the invention.

My invention is further described and defined in the form of claims as follows:

1. In a fluid pressure motor, a cylinder, a shaft, an impeller blade associated with said shaft and dividing said cylinder into two chambers, each of said chambers having an inlet port and an outlet port communicating therewith, a double wing valve pivotally mounted between said ports, a pair of knocker arms movable with said shaft to engage one end of said valve and unseat the same from the inlet port of one chamber and from the outlet port of the other chamber, each of said knocker arms having a fluid conducting passage therethrough terminating at its valve engaging end, and means to conduct fluid under pressure to said passages, said fluid under pressure discharged from said passages cooperating with said knocker arms to move said valve to close the opposite inlet and outlet ports.

2. In combination with an oscillating earth-boring bit, a pressure-fluid motor therefor comprising a casing defining an arcuate fluid chamber, an oscillatory piston member therein, the chamber being provided with inlet and outlet ports, a valve structure mounted on said casing and adapted to control said ports for actuation of the piston alternately in opposite directions, and over-center resilient means for snapping the valve-structure to its port-controlling positions alternately.

3. Apparatus as defined in claim 2 in which the valve structure and the over-center resilient means are confined substantially within the limits of a cylindrical figure of approximately the same radius as that of the arc described by the piston in its oscillating movement.

4. Apparatus as defined in claim 2 including contact means compelled to move as an incident of the movement of the piston and to initiate movement of the valve structure.

5. A pressure-fluid motor comprising a casing defining an arcuate fluid chamber, an oscillatory piston member therein, the chamber being provided with inlet and outlet ports, a valve structure mounted on said casing and adapted to control said ports for actuation of the piston alternately in opposite directions, and over-center resilient means for snapping the valve-structure to its port-controlling positions alternately, said motor including restraining means compelled to move as an incident of the movement of the piston and to shift the position of an abutment of the resilient means for timing the over-center action of the said resilient means.

6. A pressure-fluid motor as defined in claim 5 including restraining means compelled to move as an incident of the movement of the piston and to shift the position of an abutment of the resilient means for timing the over-center action of the said resilient means and means compelled to move as an incident of the movement of the piston and to initiate movement of the valve structure.

7. A pressure-fluid motor as defined in claim 5 including restraining means compelled to move as an incident of the movement of the piston and to shift the position of an abutment of the resilient means for timing the over-center action of the said resilient means, said restraining means being oscillatory and having universal hinge-joint connection to said resilient means.

8. A pressure-fluid motor comprising a casing formed with a pair of substantially aligned ports, a piston mounted in said casing, a valve extending into the ports and pivoted to the casing at a position intermediate the ports for oscillation to compel the fluid to flow from one port to the other on one side and then on the other of the valve, and over-center resilient means for snapping the valve to its port-closing positions alternately.

9. A pressure-fluid motor comprising a casing formed with a pair of substantially aligned ports, a piston mounted in said casing, a valve extending into the ports and pivoted to the casing at a position intermediate the ports for oscillation to compel the fluid to flow from one port to the other on one side and then on the other of the valve, means compelled to move as an incident of movement of the piston for contacting the valve-structure and thereby initiating its movement, and over-center resilient means for snapping the valve to its port-closing positions alternately.

10. A pressure-fluid motor comprising a casing formed with a pair of substantially aligned ports, a piston mounted in said casing, a valve extending into the ports and pivoted to the casing at a position intermediate the ports for oscillation to compel the fluid to flow from one port to the other on one side and then on the other of the valve, and a member pivoted on one end of the valve and adapted to be oscillated on its pivot in advance of the movement of the valve and to be urged by the pressure of the fluid to apply a shifting force to the valve.

11. A pressure-fluid motor comprising a casing formed with a piston chamber having the shape of a sector of a cylinder and with a pair of substantially aligned ports spaced apart longitudinally of the cylinder, an oscillatory piston mounted in said casing, a valve extending into the ports and pivoted to the casing at a position intermediate the ports for oscillation to compel the fluid to flow from one port to the other on one side and then on the other of the valve, and additional means on the receiving side of the inlet port for so controlling the flow of fluid as to cause it to exert a valve-shifting impact force against the valve.

12. A pressure-fluid motor comprising a casing formed with a piston chamber having the shape of a sector of a cylinder and with a pair of substantially aligned ports spaced apart longitudinally of the cylinder, an oscillatory piston mounted in said casing, a valve extending into the ports and pivoted to the casing at a position intermediate the ports for oscillation to compel the fluid to flow from one port to the other on one side and then on the other of the valve, and additional means on the receiving side of the inlet port for so controlling the flow of fluid as to direct a jet of fluid against the valve structure.

13. Well-drilling apparatus comprising a rotative bit so constructed as to cut in both directions of rotative movement, a pressure-fluid motor of the axial-shaft, oscillating-piston type for oscillating the bit, the bit being mounted on an extension of the axial shaft of the motor for direct drive, and inertia means constituting substantially the only means for sustaining the reaction force of the pressure fluid in said motor.

14. Apparatus as defined in claim 13 including a rubber bearing for the shaft adapted to be lubricated by the motive fluid.

CLYDE E. BANNISTER.